(12) United States Patent
Mattes

(10) Patent No.: US 6,828,697 B2
(45) Date of Patent: Dec. 7, 2004

(54) DEVICE FOR PROTECTING A PEDESTRIAN

(75) Inventor: Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 10/116,542

(22) Filed: Apr. 3, 2002

(65) Prior Publication Data

US 2002/0175499 A1 Nov. 28, 2002

(30) Foreign Application Priority Data

Apr. 6, 2001 (DE) .......................... 101 17 083

(51) Int. Cl.[7] .......................... H02B 1/24; A41D 13/00
(52) U.S. Cl. .......................... 307/116; 2/465
(58) Field of Search .......................... 307/116; 2/456, 2/465

(56) References Cited

U.S. PATENT DOCUMENTS

| | | | |
|---|---|---|---|
| 4,977,623 A | 12/1990 | DeMarco | |
| 5,500,952 A | 3/1996 | Keyes | |
| 6,125,478 A * | 10/2000 | Alaloof | 2/456 |
| 6,139,050 A | 10/2000 | Bultel et al. | |
| 6,212,456 B1 * | 4/2001 | Stride | 701/45 |
| 6,467,563 B1 * | 10/2002 | Ryan et al. | 180/274 |
| 6,560,520 B2 * | 5/2003 | Yokota et al. | 701/45 |

FOREIGN PATENT DOCUMENTS

| | | |
|---|---|---|
| DE | 43 20 226 | 1/1994 |
| DE | 298 07 171 | 4/1998 |
| DE | 198 46 641 | 4/2000 |
| JP | 7-96049 | 4/1995 |
| JP | 2000-317002 | 11/2000 |
| WO | WO 98/52433 | 11/1998 |

* cited by examiner

Primary Examiner—Adolf Berhane
(74) Attorney, Agent, or Firm—Kenyon & Kenyon

(57) ABSTRACT

A device for protecting a pedestrian from bone fractures in the event of a fall, including an airbag, an impact sensor, a cold gas generator, an igniting agent, a processor, an energy store, a charging circuit for recharging the device, and electronic and/or electrical components, which may be predominantly located on a flexible printed-circuit board. Accelerations in both the horizontal and the vertical directions may be measured by the impact sensor, which may include, for example, an acceleration sensor.

27 Claims, 1 Drawing Sheet

DEVICE FOR PROTECTING A PEDESTRIAN

FIELD OF THE INVENTION

The present invention relates to a device for protecting a pedestrian.

BACKGROUND INFORMATION

Providing an airbag for motorcyclists and bicyclists is discussed in German Published Utility Model Specification No. 298 071 71, in which a gas generator is affixed to a motorcycle or bicycle, respectively.

SUMMARY OF THE INVENTION

An exemplary device according to the present invention for protecting a pedestrian is believed to have an advantage in that an airbag device may also be available for a pedestrian. This is believed to be advantageous for people over approximately 50 years of age, since these people may have a high probability, in the event of a fall, of suffering a bone fracture, such as, for example, a femoral, femoral neck, pelvic, coccygeal, lumbar or other fracture of the locomotor apparatus. This may be avoided or at least reduced in severity by an exemplary device according to the present invention. This may result in greater safety for elderly and those at-risk and therefore in lower burdens on the health system. An exemplary device according to the present invention may also be used by mountain climbers and hikers and may thus also significantly reduce the severity of injuries, in the event of possible accidents, or may even prevent injuries. A cold gas generator is provided in an exemplary device according to the present invention, since the discharge gas temperature of a cold gas generator approximately corresponds to the ambient air temperature. The cold gas generator may comprise, for example, a steel bottle as a pressure container that is partially filled with noble gases argon or helium at high pressure, up to 600 bar, and is then pyrotechnically opened by piercing a sealing membrane or by moving a sealing screen laterally.

It is believed to be advantageous that an exemplary device according to the present invention is provided as a belt, so that it may, for example, be worn around the hips, with a width of, for example, approximately 10 cm and a thickness of 3 cm. Such a belt may then, through a triggered airbag, cushion its wearer against stresses occurring on the hips, buttocks, spinal column, and other bones, in the event of a fall, so that bone fractures may be avoided. The airbag may also protect against tissue injuries caused by falls on pointed or edged objects.

In addition, it is believed to be advantageous that an exemplary device according to the present invention includes a charging circuit and an energy store, so that the device may, for example, be worn by its wearer for an entire day and then be recharged by connecting the device to an available electricity network in the evening. The energy store may include a rechargeable store having high power density, such as, for example, double layer capacitors according to the Maxwell principle. Such energy stores may be recharged within 15 seconds, by being reconnected to the network. The electronics may be implemented, so that they are supplied for approximately 15 hours, without interruption.

Furthermore, it is believed to be advantageous that a substantial part of the electronic components of an exemplary device according to the present invention may be located on a flexible printed-circuit board, which may be easily integrated in the belt, so that the exemplary device may be worn comfortably by a person.

Furthermore, it is believed to be advantageous that the impact sensor includes an acceleration sensor allowing measurements of acceleration, both in the horizontal direction, which may occur during travel in a motor vehicle or an aircraft, and in the vertical direction, which may occur, for example, during a fall. Through a suitable triggering algorithm in a processor, only triggering events that unequivocally indicate a fall are recognized. These may include high accelerations in the vertical direction. A triggering algorithm including, for example, an adaptive threshold, may be provided for this purpose, with extensive tests for parameter determination. Integrated acceleration signals may be evaluated, i.e., speed signals.

The use of a flexible printed-circuit board is believed to be advantageous for use by a pedestrian, since an exemplary device according to the present invention may be integrated in a belt, which may be comfortable to wear.

DETAILED DESCRIPTION

Figure 1:
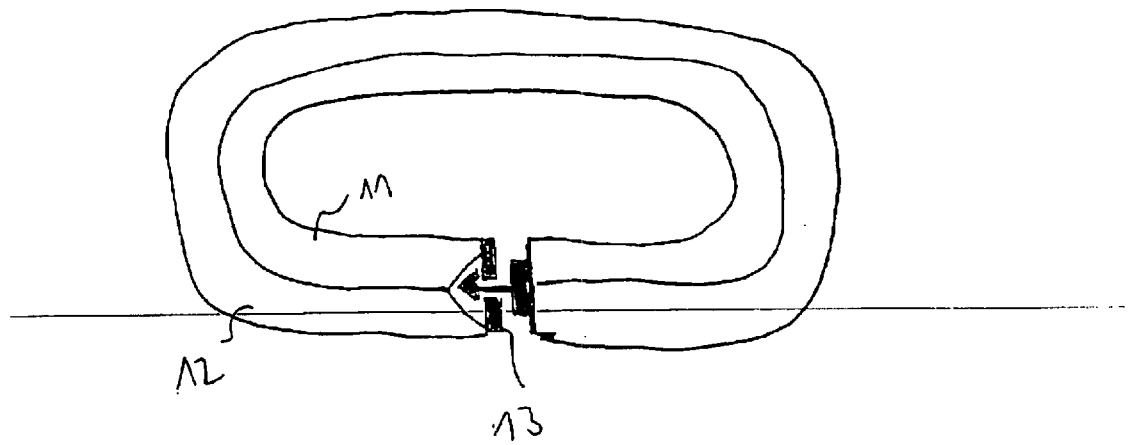
FIG. 1 shows an exemplary belt according to the present invention including a belt buckle.

FIG. 1 shows an exemplary belt according to the present invention. An electronics area 11, in which an impact sensor, a cold gas generator, an igniting agent, and a processor are located, and an airbag area 12 are components of the belt. A releasable belt buckle 13 is provided for buckling the belt. Airbag area 12, which includes an airbag, is located externally on the belt, while electronics area 11 is located internally. The majority of the electrical and electronic components included in electronics area 11 may be provided on a flexible printed-circuit board. This is believed to be advantageous for use in a belt or another device worn on a human body, since a flexible printed-circuit board may adjust itself to multiple shapes.

If a person wearing an exemplary belt according to the present invention falls, an igniting agent is ignited in electronics area 11, which then causes the airbag in airbag region 12 to expand, thus protecting the wearer of the belt in accordance with the present invention, in the event of a fall. Airbag area 12 may also be divided into segments, so that the entire extent does not have to be provided for one or more airbags. Further devices may be provided in electronics area 11 for the electrical power supply of an exemplary device according to the present invention. These may include a network voltage connection, a charging circuit and an energy store. Furthermore, an exemplary device according to the present invention may include a display for displaying, for example, that recharging of the exemplary device according to the present invention may be necessary. The operational state and possible malfunctions may also be displayed.

Figure 2:
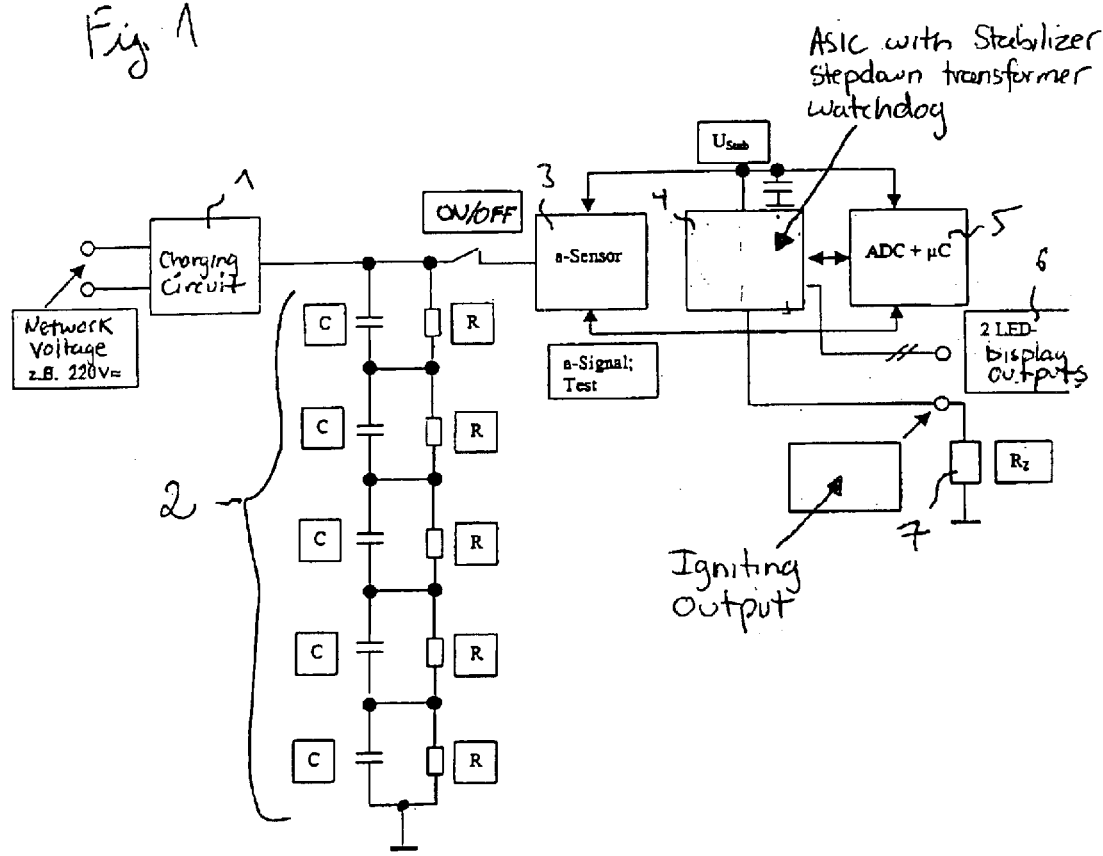
FIG. 2 shows a block diagram of an exemplary device according to the present invention.

FIG. 2 shows a block diagram of an exemplary device according to the present invention, including electronics part 11. A charging circuit 1 is provided for connection to a network voltage, such as, for example, 220 or 110 V. An energy store 2, which comprises capacitors and balancing resistors connected in parallel, is connected to charging circuit 1. The energy capacity is determined by connecting the RC parallel circuit in series. In the exemplary embodiment shown in FIG. 2, five RC circuits are connected in series to ground.

Downstream from energy store 2, an [on/off] switch is provided, for switching on the energy to the electronics area of an exemplary device according to the present invention. During recharging of energy store 2 and/or a malfunction of electronics part 11, the switch is opened. In normal operation, i.e., if a person is wearing an exemplary device according to the present invention, the switch is closed, which supplies the downstream electronics with electrical energy. The switch may be switched automatically, for example, when the belt is buckled, or manually, to activate or deactivate an exemplary device according to the present invention. The operational readiness of electronics part 11 may be visually displayed by display 6.

An acceleration sensor 3 is connected to the switch for measuring acceleration in the horizontal and vertical directions, i.e., in the direction of falling. At the beginning of operation, a test of acceleration sensor 3 is performed by a microcontroller 5 connected to a data input/output. In addition to a microcontroller 5, other types of processors may be provided. Acceleration sensor 3 and processor 5 are connected by power supply line US tab to an ASIC 4, which stabilizes the supply voltage. ASIC 4 is also connected to a display 6 for displaying the operational readiness and the power reserve. ASIC 4 is connected to an igniting agent 7 by an output, to switch the triggering energy to igniting agent 7 by a second data input/output, in case of triggering, switched by processor 5. In this manner, airbag 12 is triggered, which causes it to expand and protect the pedestrian. "Airbag" may refer to an airbag including a covering and an integrated rupture joint.

The triggering algorithm, which runs in processor 5, separates non-triggers from triggers. Non-triggers may be present during high horizontal accelerations, such as those that may occur in vehicles or aircraft. Impact sensor 3 therefore should sense in the x-direction (horizontal) and in the z-direction. The impact sensor may also sense in the y-direction, to produce a plausibility with the acceleration in the z-direction, in the event of a fall to a side. Alternatively, a rotation rate sensor may be provided, in combination with an acceleration sensor, since a pedestrian may perform a rotational movement during a fall.

An exemplary belt according to the present invention should include a suitably adjustable, releasable fastener 13, which does not open, in the event of airbag triggering, i.e., the belt should hold peripheral airbag 12 on the body.

In accordance with an exemplary embodiment of the present invention, capacitors C may have a value of 900 F at 2.3 V. In this manner, the overall capacitance of the capacitor battery will be 180 F. They may be charged at a nominal voltage of 11.5 V. A voltage of 3.3 V, at a current consumption of 20 mA, is indicated as UStab. Balancing resistor R, which is connected in parallel to C, may have a value of 47 k$\Omega$. The efficiency of the stepdown transformer may be 80%. The available stored energy may be 8.4 kJ. An uninterrupted operating time of the belt of about 15 ½ hours may result. The charging time of a totally discharged energy store 2 by charging circuit 1 may be 15.3 seconds. A low-g tilt sensor, according to the thermal principal, may be provided as acceleration sensor 3. Igniting element 7 RZ may have a resistance of 2.15 $\Omega$, and an ignition energy of 3.7 mJ in 2 ms. This may thus correspond to a seat-belt tightening system detonator. ASIC 4 may output the 3.3 V stabilized voltage and be provided as a hardware watchdog, function as a stepdown transformer, and contain a single-stage ignition stage for igniting agent 7. Furthermore, two LED outputs for function state green and/or malfunction display red may be provided. In addition, ASIC 4 may include diagnostic circuits for the triggering circuit, energy store voltage, stabilized voltage and LED outputs. These are the typical airbag electronics diagnosis functions. An 8-bit microcontroller including an analog/digital converter may be provided as the processor.

What is claimed is:

1. A device for protecting a pedestrian, the device comprising:
    an airbag;
    an impact sensor;
    a cold gas generator to provide cold gas to the airbag;
    an igniting agent;
    a processor to process at least one signal of the impact sensor and to activate the igniting agent, the processor including a microcontroller, and
    a belt, wherein at least the processor is provided on a flexible printed circuit board within the belt.

2. The device of claim 1, further comprising:
    an energy store to provide energy to the device; and
    a charging circuit to charge the energy store.

3. The device of claim 2, wherein the charging circuit connects to a network voltage.

4. The device of claim 1, wherein other electronic components of the device are located on the flexible printed-circuit board.

5. The device of claim 1, wherein the impact sensor includes an acceleration sensor.

6. The device of claim 5, wherein the acceleration sensor is operable to differentiate between an acceleration in a horizontal direction and an acceleration in a vertical direction.

7. The device of claim 1, further comprising:
    an energy store to provide energy to the device;
    a charging circuit to charge the energy store;
    wherein the impact sensor includes an acceleration sensor that is operable to differentiate between an acceleration in a horizontal direction and an acceleration in a vertical direction.

8. The device of claim 7, wherein the charging circuit is connectable to a network voltage.

9. The device of claim 7, wherein at least the processor is located on a flexible printed-circuit board.

10. The device of claim 1, further comprising:
    a display to display at least one of a charge or recharging status of the device, an operational state of the device and a malfunction of the device.

11. The device of claim 1, further comprising:
    an energy store, which includes a capacitor and resistor arrangement; and
    a charging circuit.

12. The device of claim 11, wherein the capacitor and resistor arrangement includes capacitors and resistors connected in parallel to form at least one RC parallel circuit.

13. The device of claim 12, wherein the at least one RC parallel circuit includes a plurality of RC parallel circuit connected in series.

14. The device of claim 12, wherein the at least one RC parallel circuit includes at five RC parallel circuit connected in series to ground.

15. The device of claim 13, wherein the capacitors have a value of about 900 Farads at about 2.3 volts, so that a capacitance of the capacitive energy store is about 180 Farads.

16. The device of claim 11, wherein a charging time of the energy store, when discharged, is about 15 seconds.

17. The device of claim 11, wherein an uninterrupted operating time of the device is about 15 hours.

18. The device of claim 1, wherein the impact sensor includes a low-g tilt sensor, which operates according to a thermal principle.

19. The device of claim 1, further comprising:

a display to display at least one of a charge or recharging status of the device, an operational state of the device and a malfunction of the device, wherein the display includes at least one LED.

20. The device of claim 19, wherein the display includes two LED outputs to indicate an operating state and a malfunction state.

21. The device of claim 1, further comprising:

an energy store; and a switch between the energy store and the impact sensor or the processor.

22. The device of claim 21, wherein the switch is open during at least one of a recharging of the energy store or a malfunction of the device.

23. The device of claim 21, wherein the switch operates automatically when the belt is buckled.

24. The device of claim 1, wherein the processor includes an Application-Specific-Integrated Circuit (ASIC).

25. The device of claim 1, further comprising:

an energy store to provide energy to the device, wherein the energy store includes a capacitor and resistor arrangement;

a charging circuit to charge the energy store;

wherein the impact sensor includes an acceleration sensor that is operable to differentiate between an acceleration in a horizontal direction and an acceleration in a vertical direction, and wherein the capacitor and resistor arrangement includes a plurality of RC parallel circuit connected in series.

26. The device of claim 25, wherein a charging time of the energy store, when discharged, is about 15 seconds.

27. The device of claim 25, wherein an uninterrupted operating time of the device is about 15 hours.

* * * * *